May 19, 1936.  H. J. J. M. DE REGNAULD DE BELLESCIZE  2,040,980
RECEIVING SYSTEM FOR FREQUENCY MODULATED OSCILLATIONS
Filed Nov. 18, 1932    4 Sheets-Sheet 4
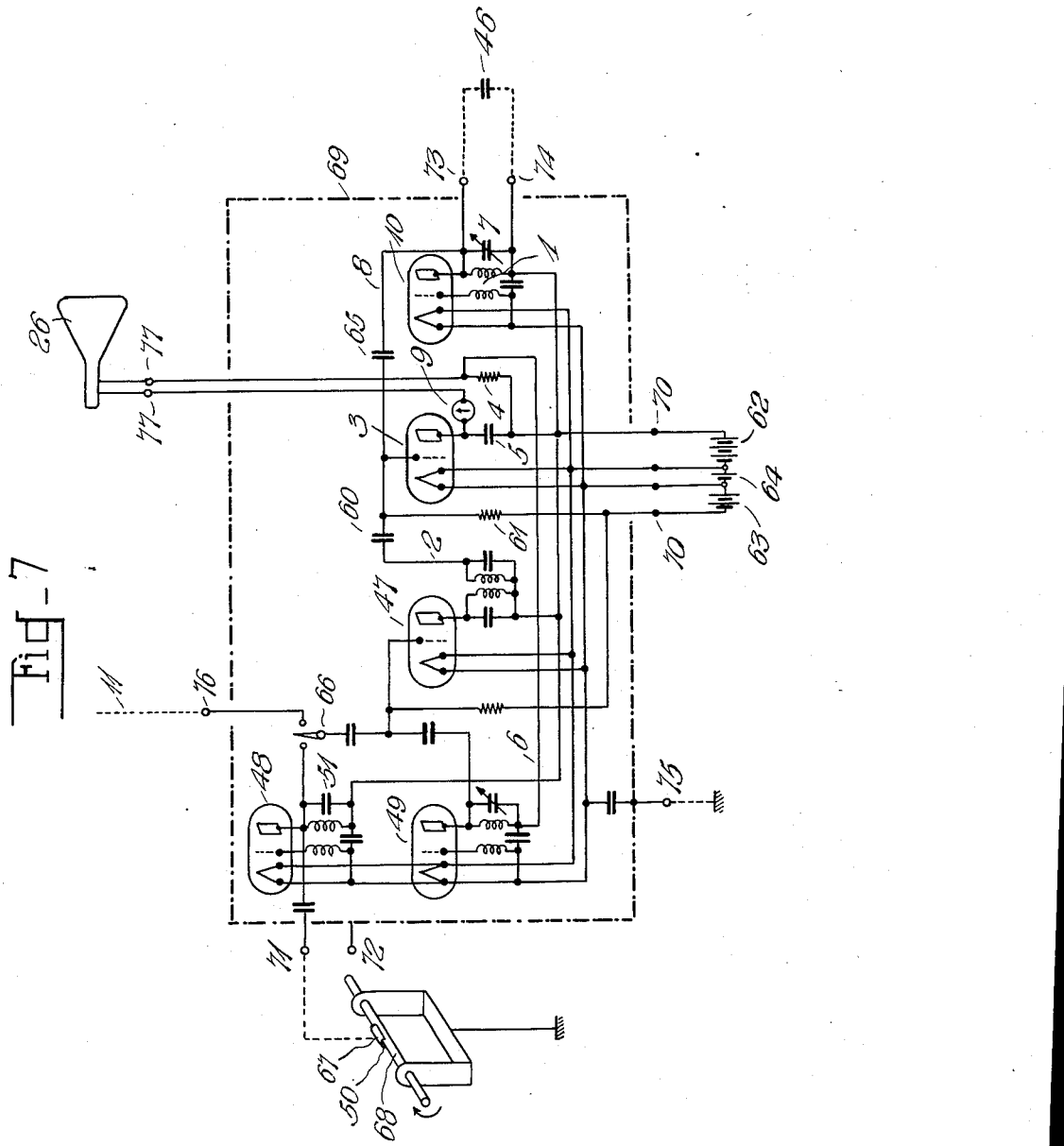
INVENTOR.
HENRI, JEAN JOSEPH, MARIE de REGNAULD de BELLESCIZE,
BY John B. Grady
ATTORNEY.

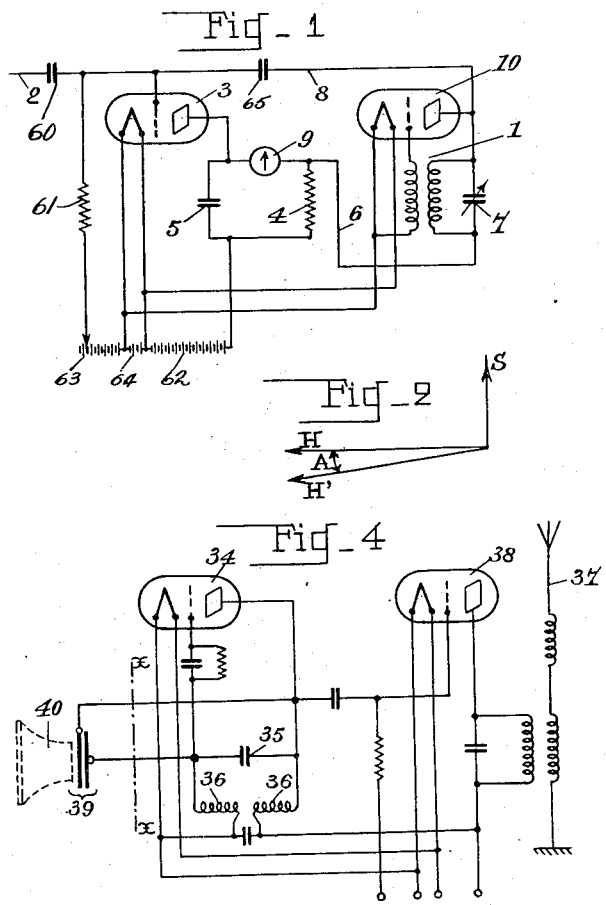

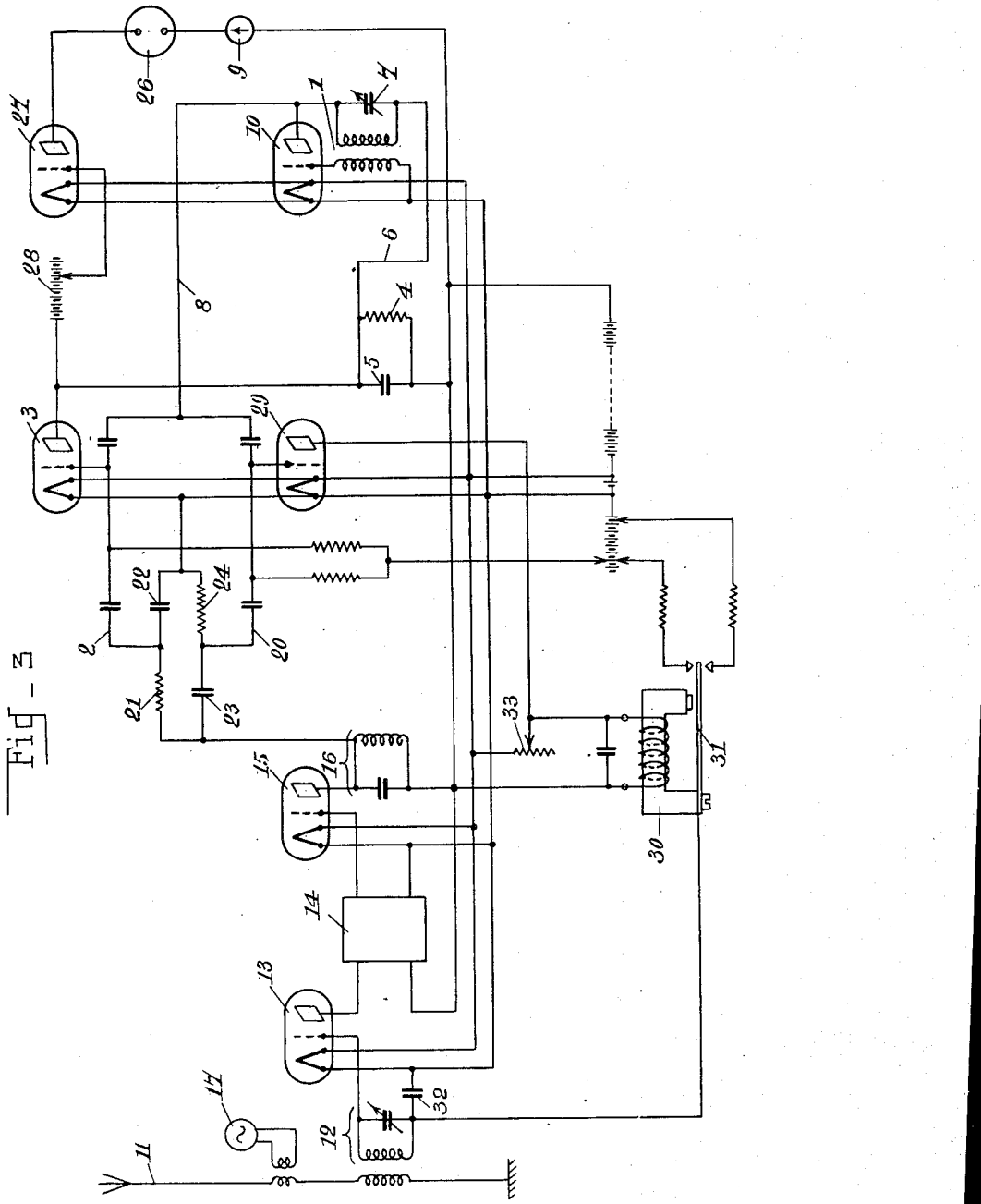

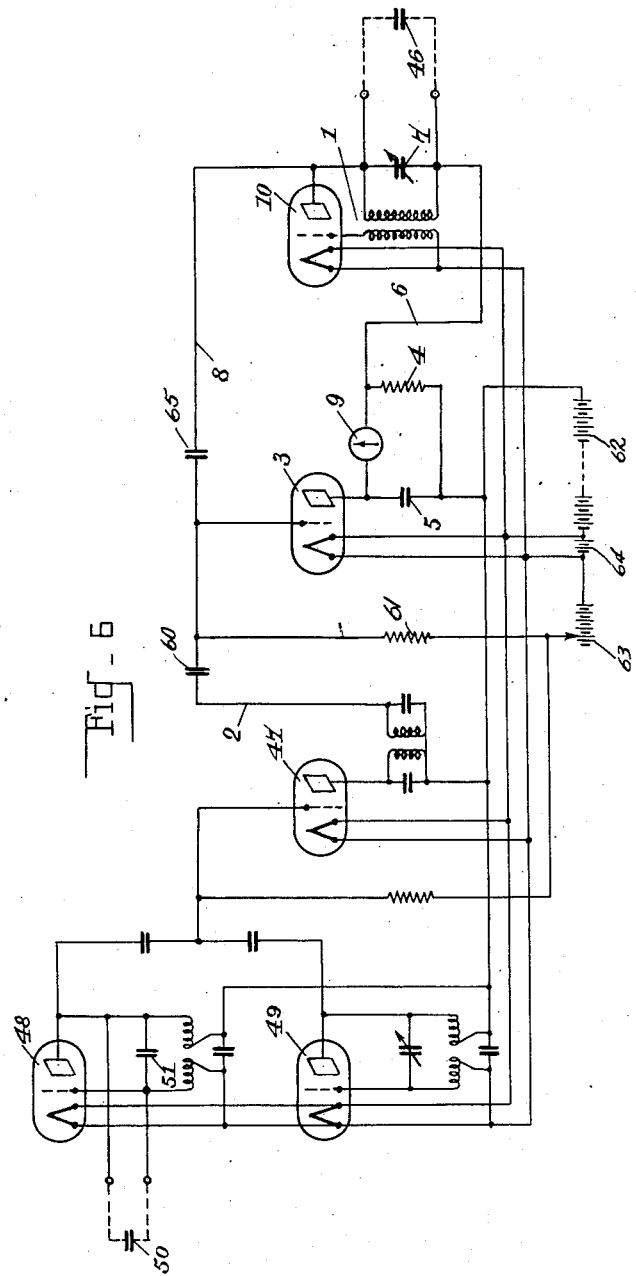

Patented May 19, 1936

2,040,980

UNITED STATES PATENT OFFICE 2,040,980

RECEIVING SYSTEM FOR FREQUENCY MODULATED OSCILLATIONS

Henri Jean Joseph Marie de Regnauld de Bellescize, Neuilly-sur-Seine, France

Application November 18, 1932, Serial No. 643,195
In Belgium November 18, 1931

10 Claims. (Cl. 250—20)

My invention relates to novel apparatus for, and methods of, determining and measuring fluctuations in the frequency of an electrical oscillation, by producing variations in the magnitude of a current in accordance with these frequency fluctuations.

One of the objects of my invention is to provide novel apparatus for, and methods of, producing precise and sensitive variations in the magnitude of a current at a receiver in accordance with the variations in frequency of a received carrier.

Another object of my invention is to provide a novel method of, and apparatus for, signalling by frequency modulations. Signalling by frequency modulation is preferred to amplitude modulation of a carrier for a number of reasons; for instance, the difficulties due to fading in an amplitude modulated system become less important in a frequency modulated system. However, frequency modulated systems have heretofore met with apparently unsurmountable difficulties in demodulation at the receiver; the ordinary receivers responsive to amplitude variations are not, for any practical purpose, responsive to frequency variations at constant amplitude.

A further object of my invention is to provide novel apparatus for, and methods of, detecting and measuring a variable physical condition, such as an acoustic vibration, or a thermic dilatation.

A still further object of my invention is to provide a novel method of measuring capacitance.

My method of detecting a variable physical condition consists in causing this physical condition to modulate the frequency of a first oscillation, in bringing this oscillation into locked synchronism with a second oscillation, and in measuring the fluctuations produced in the phase difference of these synchronized oscillations which are in accordance with the physical variations to be detected.

Other and further objects of my invention will appear in the detailed description hereinafter following by reference to the accompanying drawings, in which:

Figure 1 is a schematic diagram illustrating the arrangement for bringing the two oscillations into locked synchronism, fully described in my copending application Serial No. 574,858, filed in the United States November 13, 1931, and in France November 19, 1930, now United States Patent 1,976,877, granted October 16, 1934, for Synchronization system; Fig. 2 shows diagrammatically the manner in which this arrangement operates; Fig. 3 is a schematic diagram of a circuit for a receiving apparatus in which the frequency variations of the received oscillations actuate the recording apparatus by producing corresponding variations in the intensity of a synchronizing current; Fig. 4 is a circuit diagram of a transmitting apparatus in which a telephonic signal directly modulates the frequency of the carrier oscillation so that it can be reproduced by the receiver illustrated in Fig. 3; Fig. 5 illustrates a modification of the circuit of Fig. 4 for sending a telegraphic signal by modulating at constant frequency, the frequency of the radiated oscillation, which signals may also be recorded by the receiver illustrated in Fig. 3; Fig. 6 is a circuit diagram showing the system of my invention adapted for measuring the variations of an electrical quantity, such as a capacity; and Fig. 7 illustrates an apparatus in which the circuit diagram of Fig. 6 is adapted to the measurement of capacities, of frequency fluctuations, and of very small capacity variations caused by a physical effect to be investigated.

In Figure 1, I have disclosed a conductor 2 by which incoming electrical oscillations are conducted through the condenser 60 to the grid of a detector tube 3. Tube 3 is provided with the conventional elements connected thereto; coupling resistor 61, plate battery 62, bias battery 63, and filament heating battery 64. The input circuit of tube 3 is also connected through conductor 8 and coupling condenser 65 to the output circuit of a local oscillator. Condensers 60 and 65 are chosen small enough to prevent the frequency of the local oscillator from being influenced by the direct action of the incoming oscillation through said condensers.

The local oscillator comprises a three element tube 10 and the usual tuned feed back circuit including transformer 1 and variable condenser 7. The plate battery 62 and filament heating battery 64 are also connected to tube 10. By means of condenser 7, the local oscillator is tuned to the frequency of the incoming oscillations. In the plate circuit of tube 3 is a current indicator 9, a resistance 4 connected to the plate battery 62, and a condenser 5 in parallel with resistance 4. The plate circuit of the local oscillator is connected by conductor 6 through the resistance 4 to plate battery 62.

The local oscillation is united with the incoming oscillation at the grid of the detector tube 3. As explained in my previous application referred to above, the condenser 5 serves as a by-pass circuit for the high frequency currents, and also for the low frequency currents produced by the disturbing waves eventually received over the conductor 2. The circuit of resistance 4 and indicator 9 provides an electric path for the direct current J whose components are: a constant component produced by detecting the local oscillation; a variable component whose magnitude is proportional to the magnitude of the incoming oscillation and whose phase is determined by the phase difference between this oscillation and the local oscillation. This variable component, which I call hereinafter the synchronizing current, produces a voltage drop in resistance 4, thus controlling the plate potential of tube 10 according to the said phase difference.

Assuming now that the incoming signal over conductor 2 changes its frequency: There results a progressive change in the phase difference of the two interfering oscillations, and therefore a corresponding change in the synchronizing current, which in turn changes the plate potential of tube 10, thereby changing the frequency of the local oscillator as explained in my previous application. Theory of this change in frequency of an oscillator by changing its plate potential may also be found in Formula (13) page 100 of the "Theory of Thermionic Vacuum Tube Circuits" by L. J. Peters, McGraw Hill, 1927.

This change produced by the synchronizing current in the controlled frequency continues until the phase relation of the two interfering oscillations has reached the new value corresponding to static equilibrium, that is to say, until the frequency of the local oscillation has reached the new value of the incoming frequency.

At this point, the phase relation is different from that before the change in the frequency of the incoming oscillation occurred. Accordingly, the instrument 9 will indicate a current of constant value different from that before the change of frequency in circuit 2. Thus, for each change in incoming frequency, I have obtained a corresponding measurable change in the synchronizing current. It will now be clear that I have provided a method for transforming the frequency fluctuations of an incoming wave into variations in the intensity of a current, so that any current operating device, such as an oscillograph, can be used.

The preceding explanation enables one to understand how the phase relation of the interfering oscillations is modified when the incoming frequency passes from one constant value to another constant value. To more fully comprehend the invention, I shall now explain with the aid of equations how continuous frequency fluctuations are accurately transformed into corresponding phase difference fluctuations and consequently into continuous current fluctuations.

The incoming wave of variable frequency may be denoted as S sin B, in which S is the substantially constant amplitude and B is the phase. The frequency F is represented by:

$$F = F_0 + f = \frac{1}{2\pi} \cdot \frac{dB}{dt} \quad (1)$$

in which $F_0$ is a constant, $f$ is the variations which are to be detected.

These variations may be of different kinds. For instance: A telegraphic signal can be performed by giving to the spaces a frequency $F_0 - f_1$, and to the marks a frequency $F_0 + f_1$; then $f$ takes in turn the two constant values $-f_1$ and $+f_1$; $f$ may also designate a frequency fluctuation produced by some unknown cause as a lack of stability in a transmitting station. The fluctuations $f$ can again be produced by modulating the frequency of a carrier wave to transmit a telephonic or television signal; or again by modulating said carrier frequency at a constant frequency M, according to the equation $$\frac{1}{2\pi} \frac{dB}{dt} = F_0 + f_0 \sin 2\pi M t \quad (2)$$

If fluctuations $f$ are small and rapid, which occur when the ratio $$\frac{f_0}{M}$$

is inferior to 1, then said fluctuations cannot be denoted in an ordinary receiver: From (2) it is obvious that $$S \sin B = S \sin \left( 2\pi F_0 t - \frac{f_0}{M} \cos 2\pi M t \right)$$

According to the smallness of $$\frac{f_0}{M}$$

we may preserve only the fundamental term in the development of sin $$\left[ \frac{f_0}{M} \cos 2\pi M t \right] \text{ and } \cos \left[ \frac{f_0}{M} \cos 2\pi M t \right]$$

which gives approximately for the incoming wave:

$$S \sin B = S \left[ \sin 2\pi F_0 t + \frac{f_0}{M} \cos 2\pi M t \cdot \sin \left( 2\pi F_0 t - \frac{\pi}{2} \right) \right]$$

Its modulated component is in quadrature with its unmodulated component, as indicated by the factor $$\frac{\pi}{2}$$

in the equation; such a signal cannot be received by ordinary receivers, responsive to amplitude modulated signals in which the components of the carrier have the same phase. A new method, such as disclosed by the present invention, is indeed necessary for demodulating a frequency modulated carrier.

The incoming wave over conductor 2 is of the form given above, S sin B. The local oscillator generates an oscillation whose voltage is represented by H sin $B_1$ and of frequency $$F_1 = \frac{1}{2\pi} \cdot \frac{dB_1}{dt}$$

These two oscillations being in locked synchronism, their phase difference $B_1 - B$ is automatically maintained in the neighborhood of a certain fixed value. For the purpose of the present discussion, it will be more convenient, instead of considering this phase difference directly, to make use of an angle differing from it by 90°, that is:

$$A = B_1 - B - \frac{\pi}{2} \quad (3)$$

The synchronization will be effected in such a manner that the two oscillations are approximately in quadrature; that is to say, the angle A remains small, for example, not exceeding 0.3 radians.

The incoming oscillation, whose frequency variations $f$ are to be detected, arrives through the conductor 2 and combines, in the detector tube 3, with the locally generated oscillations.

This combination sets up, in the plate circuit of the detector, high-frequency oscillations which are short-circuited by the condenser 5, and a direct current J which passes through the resistance 4 and the milliammeter 9. It is usually necessary to make the local amplitude H considerably greater than the amplitude S of the received oscillation; the direct current is then represented, with sufficient accuracy, by the known relation:

$$J = J_0 + kS \cdot \sin A \quad (4)$$

in which $J_0$ is the current of constant intensity produced by detecting the local oscillation, $k$, a numerical coefficient, $kS \sin A$, the synchronizing current. When the Relation (4) is satisfied, the aperiodic circuit 4, 5 possesses the selective properties of a resonator for protecting the synchronizing current against any kind of electromagnetic disturbances eventually received over the conductor 2. The condenser 5 may be replaced by a low-pass filter. The variations undergone by the synchronizing current control the frequency of the local generator 1, the plate circuit of which is fed, for example, by the conductor 6 connected to the extremity of the resistance 4. Under these conditions, when the intensity of the current J passes from the mean value $J_0$ to one of the extreme values $J_0 \pm kS$, the frequency $F_1$ of the generator 1 automatically undergoes a certain well defined correction $f_m$; in other words, the unitary correction applied to the frequency of the local oscillation when the intensity of the synchronizing current varies by one unit, has the value $$\frac{f_m}{kS}$$

When the local oscillator is tuned to the frequency of the incoming oscillation by means of condenser 7, the locked synchronism of the interfering oscillations is effected automatically. This condition is shown by the fact that the current J in milliammeter 9 subsequently follows the very slight variations which may be imparted to the condenser 7. By carefully manipulating this condenser, the current J may be compelled to attain any value between the limits $J_0 - kS$ and $J_0 + kS$. The best of these adjustments is that for which the current J is thus restored to its mean value $J_0$. According to the Relation (4) the angle A is then zero and the two oscillations are in quadrature. The relative position of these two oscillations may be represented by the vectors H, S in Figure 2.

Let it be assumed that this adjustment has been effected when the frequency F of the received oscillation had the value $F_0$, for example prior to commencing the transmission of the signal. Let it be also assumed that said frequency afterwards becomes $F_0 + f$. Since the local oscillations follow, the frequency of the incoming oscillation, the local oscillations must also undergo the variation $f$, and, in consequence, the intensity of the synchronizing current becomes:

$$j = \frac{kS}{f_m} \cdot f \quad (5)$$

Therefore, the new value of the current in milliammeter 9 is $$J = J_0 + \frac{kS}{f_m} \cdot f$$

and on comparing this relation with (4) it appears that the angle A is now defined by $$\sin A = \frac{f}{f_m} \quad (6)$$

The vector representing the local oscillation has, therefore, assumed the position H' in Figure 2.

The arrangement enables the frequency variations $f$ to be measured, since they are translated into proportional variations $j$ of the synchronizing current. In fact, Relations (5) and (6) are truly satisfied only when the variations in frequency are sufficiently slow, having regard to the time constant T of the unit formed by the condenser 5 and the resistances disposed in parallel with said condenser. These resistances are those indicated by resistance 4 together with the plate circuits of the tubes 3 and 10. More generally, I have demonstrated that the variations of the angle A as a function of time $t$, are defined by the approximate equation:

$$T\frac{d^2A}{dt^2} + \frac{dA}{dt} + 2\pi f_m A = -2\pi\left(T\frac{df}{dt} + f\right) \quad (7)$$

which will be employed. This equation is valid so long as the angle A remains small and the current J is sufficiently defined by the Relation (4). Its "pendular" form proves that the two oscillations are maintained in locked synchronism by the agency of an "elastic" coupling.

To enable the apparatus to be suitably utilized, it is necessary to measure and adjust its parameters T, $kS$ and $f_m$.

The time constant T may be adjusted by regulating the condenser 5.

The parameter $kS$ is the particular value of the synchronizing current when the two oscillations are in phase. To ascertain the value of this current, all that is necessary is to manipulate the condenser 7 gently, and to read off in succession, on the milliammeter 9, the two extreme values $J_0 + kS$ and $J_0 - kS$, between which the two oscillations are maintained in locked synchronism. The desired value of $kS$ is obtained by adjusting the amplitude S of the oscillation received by the conductor 2, a result which is generally obtained by suitably regulating the device which controls automatically the amplification of the receiver.

In order to ascertain the unitary correction $$\frac{f_m}{kS}$$

that is to say, the correction applied to the frequency of the local generator when the synchronizing current varies by one unit (for example one-tenth of a milliampere), use is made of the property according to which, if the frequency of the oscillation received by the conductor 2 is constant, the synchronization holds the local frequency $F_1$ to the same frequency, even if the capacity of the condenser 7 be somewhat modified. This property signifies that the variation $dF_1$ of the frequency $F_1$, which would be intrinsically due to the slight modification $dC$ applied to the capacity C of the condenser 7, is exactly equal, and of opposite sign, to the frequency variation intrinsically due to the automatic variation $j$ of the synchronizing current. The former of these variations, however, is easily calculated by means of the known relation:

$$dF_1 = 0.5 \frac{dC}{C} F_1 \quad (8)$$

To ascertain the unitary correction—in other words, to calibrate the sensitiveness of the arrangement transforming the frequency variations into current variations—all that is necessary, therefore, is to note the capacity variation $dC$ of the condenser 7 which makes the synchronizing current to vary by one-tenth of a milliampere. The corresponding frequency variation $dF_1$, calculated by the Relation (8) is, by definition equal to $$\frac{f_m}{kS}$$

Numerous ways exist for adjusting this unitary correction to the desired value; for example, the tube 10 may be suitably chosen, or again, the grid bias of said tube may be modified, or again, the contact of the conductor 6 may be shifted along the resistance 4.

$$kS \text{ and } \frac{f_m}{kS}$$

being known, $f_m$, that is to say the maximum correction that the synchronizing current is capable of applying to the frequency of the local generator is deduced therefrom.

We may now construct the synchronizing arrangement and give it the characteristics suitable for the service in view. Several examples will now be given:

Figure 3 represents a receiving apparatus in which the frequency variations of an oscillation received by the aerial or line 11 actuate an indicating apparatus 26 by the agency of variations in the intensity of a current which synchronizes the received oscillation with a local oscillation. At first, the received oscillation traverses the usual members of a receiver, the resonators or filters 12, 16 and the amplifier 13, 14, 15. Its frequency is preferably modified by a heterodyne generator 17 and brought to approximately the mean value $F_0$ for which the synchronizing arrangement is constructed. On issuing from the usual final circuit 16, the received oscillation feeds two branches 2 and 20. The assembly of fixed capacities and resistances 22 and 23, 24 are arranged, once for all, in such a manner that the incoming oscillation in the branch 2 will be in quadrature with the incoming oscillation in the branch 20. The oscillation in the branch 2 synchronizes the local generator 1 by the agency of the arrangement 3, 4, 5, 6, already described. When the frequency of the received oscillation undergoes a variation $f$, the intensity of the synchronizing current undergoes a variation $j$ defined by the Relation (5). The variation in potential then ensuing in the resistance 4 is transmitted by the bias source 28 (which may be replaced by a condenser) to the grid of the amplifier tube 27, the effect being to set in operation the device 26, which may be a telephone, an oscillograph, a relay or any other suitable recording or indicating apparatus. Through a second detector 29, the other branch 20 feeds an arrangement that automatically controls the sensitiveness of the receiver, in order to preserve the amplitude $kS$ of the detected current from the influence of fading. At first sight, it would seem that, in this case, fading would be devoid of importance since in the Relation (5) defining the variations of current $j$ as a function of the frequency variation $f$, the correction $$\frac{f_m}{kS}$$

is a constant of the synchronizing apparatus; but in the event of the detected current $kS$ being extensively weakened as the result of fading, the same thing would occur in the maximum correction $$f_m = kS \cdot \left(\frac{f_m}{kS}\right)$$

and the ratio $$\frac{f}{f_m}$$

might exceed unity. The Relation (6) would no longer be applicable and the two oscillations would get momentarily out of synchronism. Automatic control of the amplification of the receiver in accordance with fading is, therefore, essential. It need not be very precise, but it is necessary that it should maintain the detected current at a sufficient value to insure that the maximum frequency correction $f_m$ is at least three or four times larger than the variations $f$ of the received frequency. Since $$A + \frac{\pi}{2}$$

is the phase difference between the local oscillation and the oscillation received over conductor 2, and $$\frac{\pi}{2}$$

is the phase difference between the oscillations received in conductors 2 and 20, A is the phase difference between the local oscillation and the oscillation received over conductor 20. The detected current passing through the plate circuit of the detector valve 29 has therefore the value $kS \cos A$, that is, approximately $kS$, since the angle A is small. This detected current is therefore that which is suitable for automatically controlling the amplification of the receiver. Any system may be employed for this purpose. For example, the current $kS$ energizes a relay 30, the armature 31 of which acts on the potential of the condenser 32 and controls the grid bias of the amplifier tube 13. By means of this control, the detected current $kS$ is automatically maintained between two very close limits. This intensity may be adjusted by manipulating the rheostat 33.

If the receiving apparatus is to function for a very long period without surveillance, the synchronizing arrangement 1, 3, 4, 5, 6, must be completed by the additional means of control described in my copending application Serial No. 635,451, filed in the United States September 29, 1932, and in France October 6, 1931, now United States Patent 1,990,428, granted February 5, 1935, for Synchronizing system. It should also be noted that the locked synchronism of the two oscillations which interfere in the detector 3 could also be obtained by controlling the frequency of the heterodyne generator 17 by means of the conductor 6, instead of controlling the frequency of the synchronous generator 1.

The receiving device shown in Figure 3 may be utilized for recording in an oscillograph 26, and for measuring the frequency variations accidentally undergone by the received oscillation. This measurement enables the defects of the transmitting station to be recognized and remedied. In order to settle the scale of measurement, it is only necessary, after recording, to apply to the condenser 7 the slight variation $dC$ which, according to the Relation (8) tends to modify the frequency of the generator 1 by a known quantity, for example 10 periods. This frequency modification is automatically neutralized by a variation $j$ of the synchronizing current. This variation is marked on the oscillogram and gives its scale. It has already been explained how this scale, that is to say, the unitary correction $$\frac{f_m}{kS}$$

could be modified. The simplest way is to shift the contact of the conductor 6 over the resistance 4.

The receiver of Figure 3 is also adapted to receive a telephonic, television or telegraphic signal, performed by modifying the frequency of the transmitted oscillation.

Figure 4 represents, diagrammatically, a telephone transmitter according to this method. The natural frequency $F_0$ of the master oscillator 34, 35, 36, is modulated by the sound vibrations which the mouthpiece 40 transmits to the electrostatic condenser 39 mounted in parallel on the tuning condenser 35. This frequency becomes $F_0+f$. The oscillations are amplified by the valve 38 and radiated by the aerial 37. In the receiving apparatus of Figure 3, the automatic variations of the synchronizing current $j$, and therefore the variations A of the phase difference, must faithfully reproduce the instantaneous frequency variations $f$. This condition is fulfilled by employing the synchronizing device under conditions closely approaching aperiodicity. Investigation of the Equation (7) shows that good telephonic reproduction can be obtained by giving the time constant T a value approximating 1/30000th of a second, and the maximum correction of frequency, $f_m$, a value approximate to 2800 periods.

In telegraphy, the receiver according to Figure 3 evidently enables the recording of signals, the dots of which are sent on a certain frequency, and the spaces on another frequency. A new method of transmission may also be employed, consisting in modulating at constant frequency the frequency of the transmitted oscillation and in adjusting the characteristics T and $f_m$ in the receiver so that the elastic device interpreted by Equation 7 is tuned on said modulation frequency. The transmitting station of Figure 4 may, therefore, be modified in accordance with the variant shown in Figure 5 in which the electrostatic condenser 39 oscillates under the attraction of an audio-frequency heterodyne generator 41, 42, 43 emitting, alternately, two notes $M_1$ and $M_2$ according as the circuit of the condenser 44 is closed or broken by the key 45. In the Relation (2) $f$ thus acquires the value $f_0 \sin 2\pi M_1 t$ for the marks and $f_0 \sin 2\pi M_2 t$ for the spaces. To obtain correct reproduction of the signal in the receiver of Figure 3, it is clear that the first condition to be fulfilled is to adjust the condenser 5 so that the time constant T will be much smaller than the duration of each dot of the signal. A second condition is that the elastic device formed by the synchronizing arrangement must be tuned to one of the modulation frequencies $M_1$ in order to favor it in relation to the other frequency $M_2$, thereby enabling the condition $T(2\pi M_1)2 = 2\pi f_m$ to be obtained, according to Equation (7). A third condition is to give the logarithmic decrement $$\sqrt{\frac{\pi}{2f_m T}}$$

a rather small value. In every case, these three conditions permit the choice of a suitable modulation frequency $M_1$ and enable the receiver to be constructed.

The automatic variations of the synchronizing current also enable all changes of magnitude in electrical or mechanical quantities to be measured through the agency of a variation in frequency. Figure 6 shows how a very small unknown capacity X can be measured in this manner. The oscillation of frequency F transmitted by the conductor to the synchronizing arrangement 1, 3, 4, 5, 6, already described, is produced by the interference in the detector 47 of the oscillations produced by two high-frequency heterodyne generators 48, 49. If $F_3$ be the frequency of the heterodyne generator 48, and $F_2$ that of the heterodyne generator 49, then $$F = F_3 - F_2.$$

Before performing the measurement, the generator 1 is synchronized with the frequency F, and the oscillataions combined in the detector 3 are preferabaly brought into quardature. The current is carefully read off on the milliammeter 9 and then, in order to measure the capacity X, said capacity may be placed either in the position 46 in parallel with the condenser 7 of capacity C or in the position 50 in parallel with the condenser 51, of capacity $C_3$.

The position 46 is chosen if the unknown quantity X is of the order of variations easily legible on the calibrated condenser 7. The connection of the capacity X in parallel automatically modifies the synchronizing current by a certain amount $j$, and all that is necessary is to read off the value of the variation $dC$ which must be applied to the condenser 7 in order to restore the current to its original value, in which case, evidently $X = dC$. If the capacity X be exceedingly small, it is disposed at 50, the effect being to modify the frequency $F_3$ and sonsequently F. There ensues an automatic variation of the synchronizing current which is corrected by modifying the condenser 7. This known modification being again represented by $dC$, X is obtained by the relation:

$$X = \frac{F}{F_3} \cdot \frac{C_3}{C} \cdot dC \qquad (9)$$

All the parameters figuring in the second term of this relation are easily measurable, with precision, by the usual methods. Since, on the other hand, the expression $$\frac{F}{F_3} \frac{C_3}{C}$$

can be made as small as may be desired by a suitable choice of the frequencies F, $F_3$ and of the capacities C, $C_3$, it becomes possible to measure exceedingly small capacities X.

This example shows that the invention constitutes a faithful and extremely sensitive method of transformation. In the first place, the specific sensitiveness $$\frac{kS}{f_m}$$

of the synchronizing arrangement may increase to an indefinite extent by lowering the maximum correction $f_m$, that is to say, by merely displacing the conductor 6 along the resistance 4. Secondly, it is merely necessary to dispose in front of the device a frequency-changer, to obtain a considerable multiplicative power $$\frac{C}{C_3} \frac{F_3}{F}$$

which increases the influence of the physical phenomena.

Therefore, the invention enables the very small changes undergone by a mechanical quantity (e. g., an acoustic vibration) or electrical quantity (e. g., variations of capacity) to be ascertained by first transforming said changes into proportional variations in the frequency of an oscillation, and then transforming the frequency variations into proportional variations in the intensity of a current. The recording of this current enables the changes undergone by said quantity under investigation to be measured.

Fig. 7 shows an apparatus suitable for such investigations. The circuit diagram of Fig. 7 is substantially the same as Fig. 6; switch 66 has been added in Fig. 7 for operating at will upon the frequency variations either of a local source 48 or of a distant source, incident at 11. The frequency control from the output of tube 3 acts upon the heterodyne oscillator 49, whose anode circuit is connected with resistance 4 through conductor 6; the natural frequency of oscillator 49 being much higher than that of oscillator 10, the frequency corrections can thus be more rapid and more effective.

The circuits are enclosed in a metallic box 69 which can be connected with the ground at 75. The power sources 62, 63, 64 are connected with terminals 70; an oscillograph 26 is connected with terminals 77. The connections 73, 74 are utilized for the measurement of usual capacities which are compared to a calibrated variable condenser 7. Terminals 71, 72 are used for extremely sensitive physical investigations; the figure illustrates, as an example, the mechanical examination of a rotating shaft 68. If said shaft is not well mounted, its capacity 50 with regard to the small fixed element 67, varies; said capacity variation X produces a corresponding change in the synchronizing current which is continuously recorded by oscillograph 26. According to Equation (9), the values of X are determined by comparing them to the dC changes of the calibrated variable condenser 7; X once known, the distance variations between 67 and 68 may be calculated. The same apparatus is suitable for measuring the frequency changes of a wave received through wire or antenna 11. By my invention, one may study the Doppler effect or the defects in a transmitter, as well as receive a signal. The range of the frequency variations is determined by Equation (8), in which dC again designates the change in the calibrated condenser 7 for a given change in the synchronizing current. As previously explained and shown in Fig. 3, an automatic amplification control must be added to the measuring apparatus when the received wave is subject to fading.

To sum up: The method of my invention allows the investigation of physical effects, either systematic as a signal, or fortuitous and unknown. It is accurate: The changes in the synchronizing current are proportional to the frequency fluctuations, both in magnitude and in sign. Such result is obtained because the phase relation of the synchronized waves is maintained near to $$\frac{\pi}{2}$$

and because the synchronizing current's intensity is wholly independent of the amplitude of the received wave, provided said amplitude is affording a convenient frequency correction $f_m$. It is extremely sensitive: Changes of one cycle in frequencies, of $10^{-3}$ $\mu\mu$ F. in capacities, of $10^{-5}$ millimeter in mechanical variations, are easily ascertained. The recording of such changes may be continuous.

Investigations upon Hertzian waves are correct, because the circuit 4, 5 acts as a low pass filter to protect the synchronizing current $kS \sin A$ against static and interfering waves.

The invention is equally applicable for recording the signals produced by modulating the phase of the carrier oscillation since modulating the phase and modulating the frequency are two different ways of expressing the same thing. When the frequency is modulated in accordance with the Relation (2), this means that the phase B has the form $$B = 2\pi F_0 t - \frac{f_0}{M} \cos 2\pi M.t + \text{constant}$$

Consequently, the vector representing the oscillation describes a pendular movement $$\frac{f_0}{M} \cos 2\pi Mt$$

with reference to the vector whose angular velocity is $2\pi F_0$.

While I have described my invention in certain preferred embodiments, I realize that modifications may be made and that I intend no limitations upon my invention other than may be imposed by the scope of the appended claim.

I claim:

1. The method of detecting a physical effect which comprises, separately generating two waves, influencing the phase relation of these waves by the physical effect to be detected, beating said wave together maintaining the said waves in a state of locked synchronism by means of the intermodulation current produced by their coaction, and utilizing the changes produced in the phase relation of the said waves to indicate the characteristics of said physical effect.

2. A system for detecting frequency fluctuations of a wave with reference to a predetermined frequency, which comprises, a source generating an auxiliary wave normally of the said predetermined frequency, a detector in which said waves coact, means for deriving from this coaction an intermodulation current which is substantially a sinusoidal function of the angular difference between $$\frac{\pi}{2}$$

and the phase relation of the waves, a frequency control system whereby this intermodulation current maintains the said waves in a state of locked synchronism, and a recorder responsive to the changes in the said intermodulation current.

3. Method of investigating frequency variations which comprises, combining the oscillation of varied frequency with a heterodyne oscillation so as to produce an intermediate frequency oscillation, generating a homodyne oscillation whose natural frequency is that of the intermediate oscillation, combining said intermediate frequency oscillation and said homodyne oscillation, deriving an intermodulation current from the coaction of the said intermediate and homodyne oscillations, maintaining these coacting oscillations in locked synchronism under the control of their intermodulation current, and recording the intensity fluctuations of the said current.

4. A synchronized system for transforming the frequency fluctuations of a wave into phase difference fluctuations between said wave and an auxiliary wave, which comprises, means for generating an auxiliary wave, a detector upon which the two said waves coact, means whereby this coaction produces an intermodulation current of intensity varying substantially with the said phase difference fluctuations, a frequency control device operative by the said intermodulation current to maintain the said waves in a state of locked synchronism, a circuit interconnecting the detector and the frequency control device and characterized by a given time constant; and means for adjusting the time constant of said interconnecting circuit and the magnitude of the frequency control, the said adjustments compelling the synchronized system to operate under suitable conditions of natural periodicity and of damping.

5. A synchronizing device for investigating a variable physical condition by means of the fluctuations in the phase difference between two synchronized oscillations, which comprises, means to cause the said physical condition to influence the frequency of one of said oscillations, a detector upon which the two oscillations coact, means whereby this coaction produces a detected current of intensity varying substantially as the said phase difference fluctuations, a circuit characterized by a given time constant including a condenser and a resistance, a voltage drop produced across said resistance by the intensity variations of the detected current, means to control the frequency of one of the oscillations by the said voltage drop, means for adjusting the said time constant and the magnitude of the said frequency control, said adjustments being effective to cause the synchronizing device to operate under suitable conditions of natural frequency and of damping; and an apparatus responsive to the said phase difference fluctuations.

6. A system for detecting the frequency variations of a Hertzian wave and consequently the causes of the said variations, comprising, in combination, a receiver in which the Hertzian wave produces an oscillation, a gain control device acting on the amplification of said receiver to overcome fading effect, a local generator producing an auxiliary oscillation, a synchronizing means maintaining the auxiliary oscillation approximately in quadrature with the oscillation produced by the Hertzian wave, means for generating a current depending upon the phase difference of the said synchronized oscillations, and a recording apparatus responsive to the intensity variations of the said current.

7. A system for investigating a physical effect which comprises, two sources generating waves of the same natural frequency, a variable calibrated condenser, means to separately influence the frequency relation of the said waves by the said physical effect and by the capacity variations of the said condenser respectively, a detector upon which the two waves coact, means under the control of the intermodulation current issued from this coaction to maintain the said waves in a state of locked synchronism, and an indicator responsive to the intensity fluctuations of the said current.

8. A receiver for detecting frequency modulated signal waves, which comprises, a circuit constituting a path for the received oscillation issued from the signal wave, a source generating a local oscillation, a detector, said oscillations being impressed on said detector whereby the coaction of the received oscillation and of the local oscillation produces an intermodulation current, a frequency control system by the means of which said intermodulation current maintains the two said oscillations in a state of locked synchronism, and a recording apparatus responsive to the intensity changes in this intermodulation current.

9. A synchronized system for selectively transforming a frequency modulation of given periodicity into phase difference fluctuations between the frequency modulated wave and an auxiliary wave, which comprises, means for generating an auxiliary wave, a detector upon which the two waves coact, means whereby this coaction produces an intermodulation current of intensity varying with the said phase difference fluctuations, a frequency control device operative by the said intermodulation current to maintain the waves in locked synchronism, a circuit interconnecting the detector and the frequency control device and characterized by a given time constant; and means for adjusting the time constant of said interconnecting circuit and the magnitude of the frequency control, the said adjustments being effective to tune the natural periodicity of the synchronized system to the periodicity of the frequency modulation.

10. The method of investigating a physical effect which comprises, separately generating two waves, combining said waves, causing the said physical effect to influence the natural frequency relation of these waves, deriving from their intermodulation a synchronizing current which maintains the said waves in a state of locked synchronism, and recording the intensity changes of the said synchronizing current.

HENRI JEAN JOSEPH MARIE DE
    REGNAULD DE BELLESCIZE.